June 24, 1930.  J. M. TANZI  1,768,013
MILK POT
Filed Oct. 21, 1929
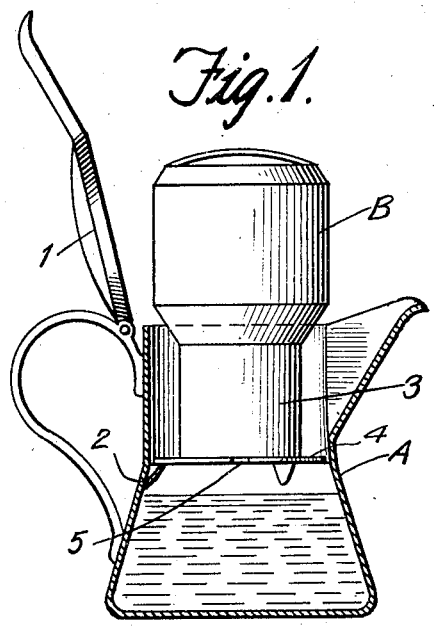
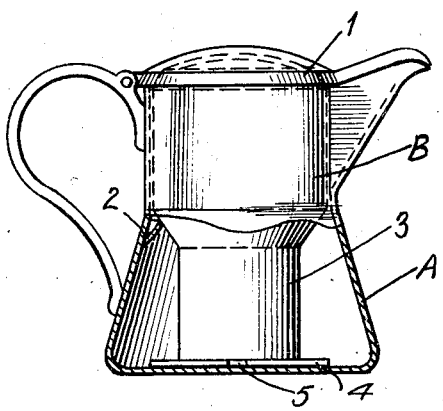
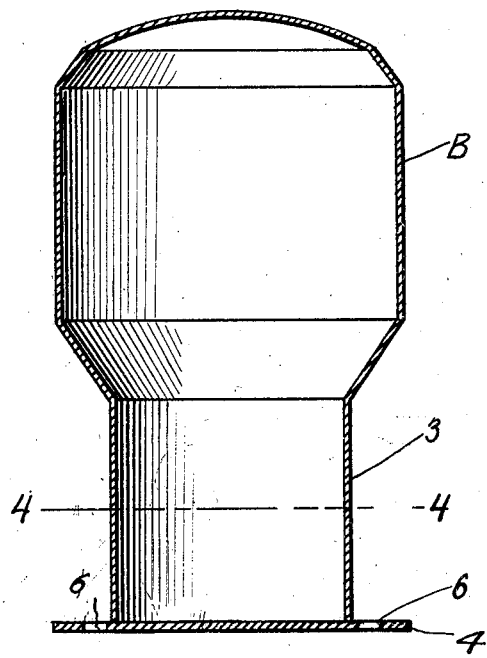
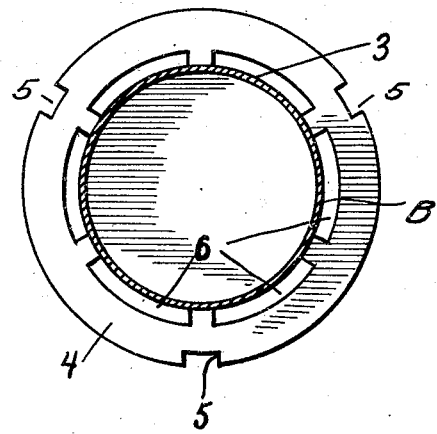
Joseph M. Tanzi INVENTOR Patented June 24, 1930

1,768,013

UNITED STATES PATENT OFFICE

JOSEPH M. TANZI, OF LOS ANGELES, CALIFORNIA

MILK POT

Application filed October 21, 1929. Serial No. 401,241.

This invention relates to a device whereby milk and the like can be sterilized without danger of the milk or other liquid boiling up over the top of the device, the general object of the invention being to provide a receptacle for containing the milk or other liquid to be heated and a second receptacle extending into the upper part of the first receptacle and adapted to contain a cooling medium whereby when the milk or other liquid rises in the upper part of the first receptacle, due to the boiling action, the second receptacle, containing the cooling medium, will act to lower the temperature of the milk and produce a perfect condensation of steam, whereby the milk will continue to boil without overflowing the receptacle containing it.

Another object of the invention is to so form the parts that the second receptacle can be enclosed in the first receptacle when not in use.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a vertical sectional view through the outer receptacle and showing its cover raised, with the inner receptacle in elevation and in operative position.

Figure 2 is a view partly in section, showing the outer receptacle closed and the second receptacle therein.

Figure 3 is an enlarged vertical sectional view through the inner receptacle.

Figure 4 is a section on line 4—4 of Figure 3.

In these views, the letter A indicates the outer receptacle which is to contain the milk or other material to be sterilized. This receptacle is preferably made in the form of a pitcher, as shown, and is provided with a hinged cover 1. Projections 2 are located on the interior walls of the receptacle about midway the ends thereof. The milk or other matter to be boiled is placed in said receptacle with its level slightly below the projections, as shown in Figure 1. The inner receptacle B is of substantially cylindrical shape in cross section with a lower reduced part 3 having a flange 4 at its bottom, this flange being provided with exterior notches 5 and the internal holes 6. The notches 5 are so placed that when they come opposite the projections 2, the flange can pass over the projections and thus the inner receptacle can be placed in the outer receptacle, as shown in Figure 2, with the flange resting on the bottom of the outer receptacle. When the device is to be used, the inner receptacle is raised until the flange is located above the projections and then it is turned to bring the solid portions of the flange over the projections so that the inner receptacle will be supported by the projections, as shown in Figure 1. Cold water or any other cooling medium is placed in the inner receptacle and then the entire device is placed on a stove or other heating medium to boil the milk. When the milk begins to boil, it will, of course, rise in the outer receptacle and thus come in contact with the inner receptacle so that this inner receptacle will cool the upper body of the milk and condense the steam so that the milk is prevented from overflowing the outer receptacle. Thus the milk can be boiled for any desired length of time without danger of it overflowing, to properly sterilize the same.

When the device is not being used, the inner receptacle is lowered into the outer receptacle and the cover 1 closed, as shown in Figure 2.

When the milk rises in the outer receptacle, it will pass through the openings 6 in the flange into the space containing the lower reduced part of the inner receptacle.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A device of the class described comprising an outer receptacle adapted to contain the liquid to be sterilized, projections on the outer wall thereof spaced above the liquid level of the receptacle, an inner receptacle having a lower reduced part fitting in the upper part of the outer receptacle and adapted to contain a cooling medium, a flange on the lower end of the reduced part having notches for passing over the flanges when the inner receptacle is to be placed entirely within the outer receptacle, the flange resting on the projections to hold the inner receptacle spaced from the bottom of the outer receptacle and said flange having openings therein through which the boiling liquid in the outer receptacle will pass to contact the inner receptacle.

In testimony whereof I affix my signature.

JOSEPH M. TANZI.